UNITED STATES PATENT OFFICE.

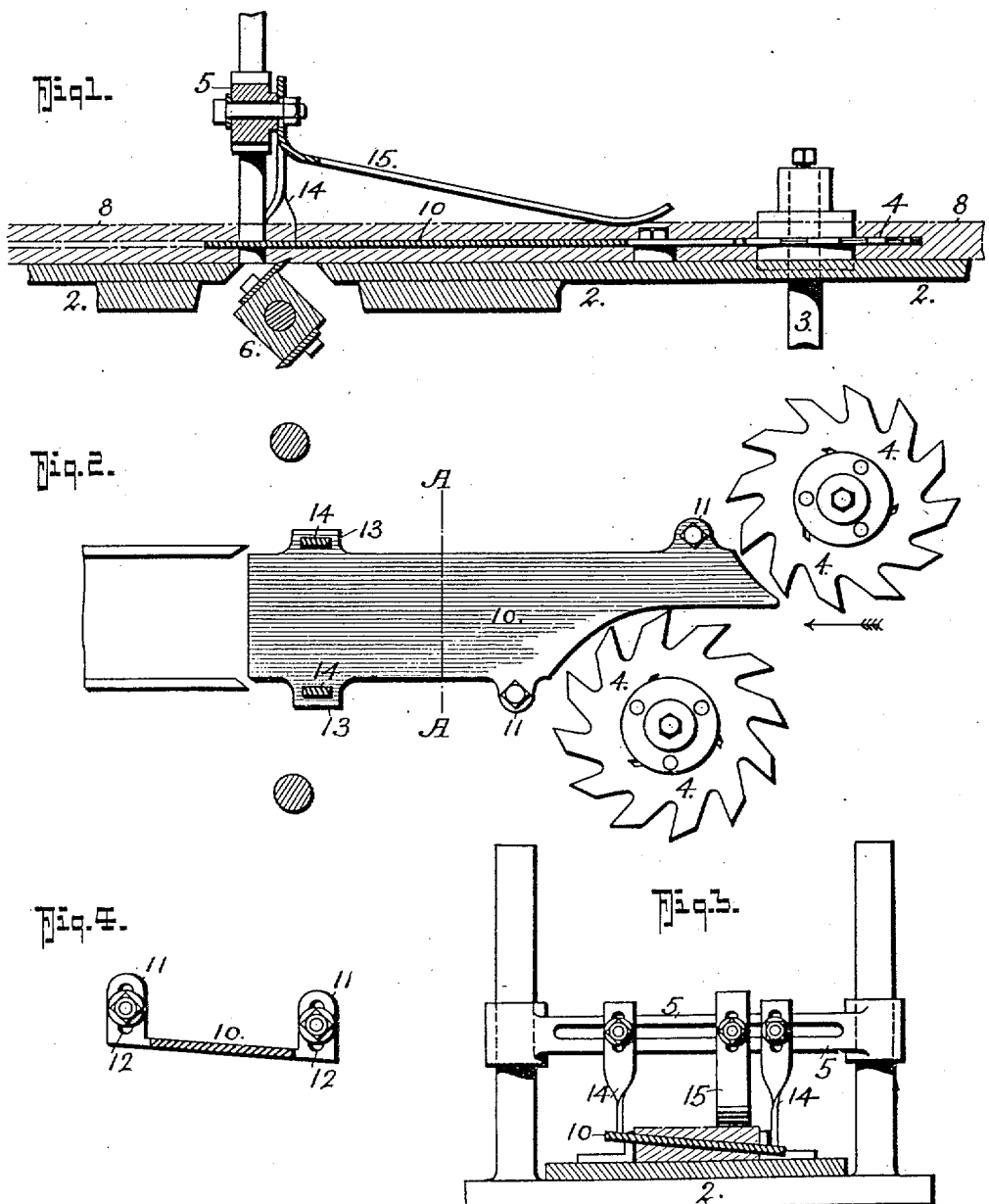

JOHN W. BURNS AND GEORGE B. BURNS, OF NEW WESTMINSTER, BRITISH COLUMBIA, CANADA.

SEPARATING-PLATE FOR BOARD-CUTTING SAWS.

955,379.     Specification of Letters Patent.     Patented Apr. 19, 1910.

Application filed July 24, 1909. Serial No. 509,455.

*To all whom it may concern:*

Be it known that we, JOHN W. BURNS and GEORGE B. BURNS, citizens of the United States of America, residing at New Westminster, in the Province of British Columbia, Canada, have invented new and useful Improvements in Separating - Plates for Board-Cutting Saws, of which the following is a specification.

This invention relates to an attachment to a planing machine as is used for dressing the tops, bottoms and edges of a board, which attachment is designed to be used in conjunction with the board splitting cutter head which is the subject of a patent application filed on the 10th day of March, 1909, under Serial No. 482,419; by the use of which head we are enabled to simultaneously split the thickness of a board which is being dressed on its top, bottom and edges in an ordinary planing machine.

In the use of the board splitting planer head which is the subject of the patent application before referred to, we have experienced difficulty in providing a suitable separating plate that will relieve the saws of the weight of the upper split board which would otherwise cause undue friction and heating of the saws, and that will also enable pressure to be applied to the lower board to hold it in contact with the cutter which surfaces the under side of the board, when this surfacing of the under side is performed after the board has been split. Obviously pressure cannot be applied to the upper side of the board to hold the board down on the surfacing cutter, as such pressure would nip the saws between the split board. These requirements have been met by the invention which is the subject of this application, by the provision of a horizontally disposed separating plate the thickness of which is slightly in excess of the cut of the splitting saws, and the end of which in plan conforms to the outline of the edges of the saws, one in advance of the other, where the board leaves them.

This separating plate is supported from the bed or frame of the machine by attachments laterally, beyond the width of the board being cut, which attachments are adjustable to provide for variation in thickness of the boards being cut, and where the lower surfacing is performed after the boards are split this separating plate is extended over the lower surfacing cutter and is provided with projections laterally beyond the width of the board to be cut, on which lateral projections bear members from the presser bar to hold the lower split half of the board down on the surfacing cutter beneath.

The invention is particularly described in the following specification, reference being made to the drawings by which it is accompanied, in which:

Figure 1 is a longitudinal sectional elevation through the separating plate showing its relation to the splitting saws and adjacent parts. Fig. 2, a plan of the same, Fig. 3, a cross section on the line A A in Fig. 2. Fig. 4, an alternative means for adjustably securing the presser plate to the bed of the machine.

In these drawings 2 represents the bed of the machine, 3 being the spindles of the edge cutting heads, to which the board splitting saws 4 are secured, and 5 the presser bar by which under ordinary use of the machine the board being dressed is held down upon the bottom cutter 6 which surfaces the under side. It will be noted the bar 5 serves as a weight and slides up and down on the side rods or spindles on which it is mounted, see Figs. 1 and 3.

Supported horizontally in the plane of the horizontal saws 4 and conforming approximately to the outline of their edges where the board leaves them, is the separating plate 10 which plate may be adjustably supported in any suitable manner from the bed of the machine by lateral projections 11 beyond the width of the board to be cut. This supporting means may either consist of a simple bolt and washer on each side, the thickness of the washers being varied to the required thickness of the board, or as shown in Fig. 4, the lateral projections 11 may be vertically disposed and provided with elongated holes 12 for attachment to the bed of the machine by the bolts or screws.

Where, as shown in the drawings, the surfacing is performed after the board has been split, the separating plate 10 is extended to a position over the lower surfacing cutter 6, and is there laterally extended as at 13 on each side to receive beyond the width of the board downward projections 14 from the presser bar 5.

In operation, the board 8 is passed through the planer as in the ordinary manner for dressing its top, bottom and edges, in which operation the horizontal saws 4 secured on the same spindle as the edge dressing cutters, simultaneously split the board into two. Where beveled siding is required the spindles 3 are tilted to cut the desired bevel. The upper and lower half of the split board pass respectively above and below the separating plate 10 the first engaging edge of which conforms closely to the outline of both saws, and the saws are thus relieved at once of any friction which the nip of the boards on them might tend to produce, and thus heating of the saws is avoided and smoother work on the boards results.

When the surfacing of the under side of the board is performed after the splitting by the horizontal saws the end of the separating plate 10 over the bottom surfacing cutter 6 will by means of the presser bar 5 hold the under board down on the cutter.

Where, as with wood easily split, such as cedar, there is a tendency of the after end of the upper board to split away from the under one before it is completely severed by the saws, and thus leave an uneven surface at the end of each board, a spring presser plate 15 secured to any convenient part of the frame of the machine, as shown in the drawing to the presser bar, is brought to bear on the upper side of the board immediately over the splitting saws adjacent to the end of the separator 10.

Having now particularly described our invention and the manner of its use, we hereby declare that what we claim as new and desire to be protected in by Letters Patent, is:

1. In a wood working machine having horizontally disposed saws one in advance of the other on each side to divide the thickness of a board, means for relieving the saws of the weight of the upper split board said means comprising a horizontally disposed plate extending from the edge of each saw in the direction of movement of the board, projections at one end from this plate beyond the width of the board which the saws are designed to split which projections are provided with elongated apertures for adjustably securing the plate to the frame of the machine by bolts or screws and means for supporting the other end of said plate for vertical and horizontal adjustments.

2. In a wood working machine having horizontally disposed saws to divide the thickness of a board, the combination therewith of a separating plate that will relieve the saws of the weight of the upper board when split, of means for securing the separating plate at one end to the bed of the machine, and means for applying downward pressure to the plate on the end farther from the saws.

3. In a wood working machine having horizontally disposed saws on each side to divide the thickness of a board, the combination therewith of a separating plate to relieve the saws of the weight of the upper board when split and means for applying a yielding pressure to the upper side of the board adjacent to the last saw to cut.

4. In a wood working machine having cutters whereby the top, bottom and edges of a board may be dressed, and horizontally disposed saws on the spindles of the edge cutters, the combination therewith of a separating plate supported from the bed of the machine outside the width of the board to be dressed said plate being carried from as close as practicable to the two saws to a position over the cutter which surfaces the under side of the board at which position the width of the plate is extended beyond the width of the board to be cut, and means for applying downward pressure to the plate over the cutter which dresses the under side of the board.

5. In a wood working machine, two saws rotatable in a common plane and located one in advance of the other, a plate spreader located in the same plane as the saws and having a portion projected into close proximity to one saw and having a portion cut away to receive a projecting part of the other saw, said plate having lateral bearing members to sustain said plate near one end, upwardly projected bearing members at the other end of said plate, said upwardly projected bearing members having slots, a transversely slotted support to which said upwardly projected members are bolted for vertical and horizontal adjustment of the plate.

6. In a wood working machine, two saws rotatable in a common plane and located one in advance of the other, a plate spreader located in the same plane as the saws and having a portion projected into close proximity to one saw and having a portion cut away to receive a projecting part of the other saw, said plate having lateral bearing members to sustain said plate near one end, upwardly projected bearing members at the other end of said plate, said upwardly projected bearing members having slots, a transversely slotted support to which said upwardly projected members are bolted for vertical and horizontal adjustment of the plate, and a presser secured to said transversely slotted support and projected over said plate.

In testimony whereof we have signed our names to this specification in the presence of two subscribing witnesses.

JOHN W. BURNS.
GEO. B. BURNS.

Witnesses:
N. F. H. BURKLIN,
ROWLAND BRITTAIN.